United States Patent
Morgan et al.

(10) Patent No.: US 10,112,142 B2
(45) Date of Patent: Oct. 30, 2018

(54) METHOD OF ENHANCING REMOVAL OF GASEOUS CONTAMINANTS FROM A FEEDSTREAM IN A TREATMENT CHAMBER HAVING LIQUID MEDIUM

(71) Applicant: Baker Hughes, a GE company, LLC, Houston, TX (US)

(72) Inventors: Waynn C. Morgan, Alvin, TX (US); Carl E. Weaver, Conroe, TX (US); Corina Sandu, Pearland, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 447 days.

(21) Appl. No.: 14/571,088

(22) Filed: Dec. 15, 2014

(65) Prior Publication Data
US 2016/0166981 A1 Jun. 16, 2016

(51) Int. Cl.
B01D 53/14 (2006.01)

(52) U.S. Cl.
CPC ..... *B01D 53/1487* (2013.01); *B01D 53/1468* (2013.01); *B01D 53/1493* (2013.01); *B01D 2252/202* (2013.01); *B01D 2252/204* (2013.01); *B01D 2252/205* (2013.01); *B01D 2252/2025* (2013.01); *B01D 2252/20436* (2013.01); *B01D 2257/306* (2013.01); *B01D 2257/708* (2013.01); *B01D 2259/4516* (2013.01)

(58) Field of Classification Search
None
See application file for complete search history.

(56) References Cited

U.S. PATENT DOCUMENTS

| | | | |
|---|---|---|---|
| 4,526,773 | A | 7/1985 | Weber |
| 5,034,118 | A | 7/1991 | Bricker et al. |
| 6,143,553 | A | 11/2000 | Teller |
| 7,740,816 | B1 | 6/2010 | St. Amant et al. |
| 7,803,337 | B1 | 9/2010 | St. Amant et al. |
| 7,819,952 | B2 | 10/2010 | Saboe |
| 8,137,445 | B2 | 3/2012 | Cash et al. |
| 8,524,184 | B2 | 9/2013 | Iyengar et al. |
| 8,795,420 | B1 | 9/2014 | St. Amant et al. |
| 8,801,843 | B1 | 9/2014 | St. Amant et al. |
| 8,894,758 | B2 | 11/2014 | Cash et al. |
| 8,894,955 | B2 | 11/2014 | Smits et al. |

(Continued)

FOREIGN PATENT DOCUMENTS

WO 2010060975 6/2010

OTHER PUBLICATIONS

Attari et al., "Sampling and Analysis of Natural Gas Trace Constituents." Institute of Gas Technology, Sep. 1993.*

(Continued)

*Primary Examiner* — Daniel Berns
(74) *Attorney, Agent, or Firm* — John Wilson Jones; Jones Delflache LLP

(57) ABSTRACT

Contaminants, such as volatile organic compounds and hydrogen sulfide, may be removed from a gaseous feedstream by introducing the gaseous feedstream into a treatment chamber containing a liquid medium comprising a hydrogen sulfide or mercaptan scavenger or a blend comprising (i) an absorbent and (ii) a glycol ether and/or $C_6$-$C_{18}$ alcohol, wherein the glycol ether and/or alcohol enhances the solubility of the contaminant in the absorbent.

19 Claims, 2 Drawing Sheets

(56) References Cited

U.S. PATENT DOCUMENTS

| | | | |
|---|---|---|---|
| 2003/0108703 A1* | 6/2003 | Lang | A61L 9/01 |
| | | | 428/35.7 |
| 2003/0175186 A1* | 9/2003 | Cohen | B01F 3/04531 |
| | | | 422/224 |
| 2004/0055463 A1* | 3/2004 | Anthony | C02F 1/20 |
| | | | 95/8 |
| 2008/0226525 A1* | 9/2008 | Jamal | B01D 53/1468 |
| | | | 423/230 |
| 2010/0116135 A1 | 5/2010 | Avina | |
| 2013/0302233 A1* | 11/2013 | Smits | B01D 53/1487 |
| | | | 423/226 |
| 2013/0315807 A1 | 11/2013 | Vera-Castaneda | |
| 2013/0320258 A1* | 12/2013 | Lehrer | B01D 53/1493 |
| | | | 252/189 |
| 2014/0134710 A1 | 5/2014 | Grill | |
| 2014/0252276 A1 | 9/2014 | Chandran et al. | |
| 2014/0305845 A1 | 10/2014 | Ramachandran et al. | |
| 2014/0314620 A1 | 10/2014 | Lehmann et al. | |
| 2016/0030916 A1 | 2/2016 | Shen et al. | |

OTHER PUBLICATIONS

Nesvacil, D. et al., Upstream Oil an Gas Storage Tank Project Flash Emmission Models Evaluation, Final Report for Hy-Bon Engineering Company, Inc., Jul. 16, 2009, Midland, Texas.

* cited by examiner

METHOD OF ENHANCING REMOVAL OF GASEOUS CONTAMINANTS FROM A FEEDSTREAM IN A TREATMENT CHAMBER HAVING LIQUID MEDIUM

FIELD OF THE DISCLOSURE

Gaseous contaminants, such as hydrogen sulfide, mercaptans and volatile organic compounds, may be removed from a gaseous feedstream by passing the feedstream through a liquid medium in a treatment chamber within a gas scrubber. The liquid medium contains either a hydrogen sulfide or mercaptan scavenger or a blend of (i) an absorbent for the contaminant and (ii) a glycol ether and/or $C_6$-$C_{18}$ alcohol. The glycol ether and/or $C_6$-$C_{18}$ alcohol enhances the solubility of the contaminant in the absorbent.

BACKGROUND OF THE DISCLOSURE

In many utility and industrial processes, the management of emissions is critical to control the release of undesirable materials into the environs. Such materials include volatile organic compounds (VOCs) such as hydrocarbons, oxygenated hydrocarbons, nitrogen compounds, aldehydes and ketones. The danger of release of such materials is especially acute when liquids (such as crude oil, gasoline, jet fuel and diesel) are held in storage tanks, pipelines, operating units or other vessels.

Further, in the transport, storage, and processing of crude oil, in waste water associated with crude oil production, in gases associated with such water and oil, as well as in the storage of fuel oil (including gasoline, jet fuel and diesel), hydrogen sulfide and mercaptans, as well as other sulfhydryl compounds, are often encountered. In addition to being highly corrosive, the presence of hydrogen sulfide and mercaptans is objectionable because they often react with other hydrocarbons or fuel system components. Uncontrolled emissions of hydrogen sulfide, mercaptans and other sulfhydryl compounds associated with water and hydrocarbon vapors further gives rise to severe health hazards as they are characterized by strong noxious odors.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improvements which are useful in the control of the emissions of VOCs, hydrogen sulfide and mercaptans having one or more of the attributes or capabilities described or shown in, or as may be apparent from, the other portions of this patent.

SUMMARY OF THE DISCLOSURE

In an embodiment of the disclosure, a method of removing a gaseous contaminant from a gaseous feedstream is provided wherein the gaseous feedstream is first introduced into the treatment chamber of a gas scrubber. A liquid medium comprising an absorbent is present in the treatment chamber. The liquid absorbent may be a hydrogen sulfide or mercaptan scavenger or may be a blend for capturing and removing volatile organic compounds (VOCs) from the gaseous feedstream. The blend may contain an absorbent for capturing VOCs and, as a second component, a glycol ether or a $C_6$-$C_{18}$ alcohol. The glycol ether and/or $C_6$-$C_{18}$ alcohol enhances the solubility of the VOC contaminant in the absorbent. The gaseous feedstream is intermingled with the liquid absorbent medium in the treatment chamber. The gaseous product stream removed from the treatment chamber is substantially free of the gaseous contaminant.

In an embodiment, the second component may be a methyl ester, such as a soy methyl ester.

In another embodiment, the second component may be a liquid hydrocarbon such as diesel, kerosene, gasoline, jet fuel and fuel oil as well as a mixture thereof.

In another embodiment of the disclosure, a method of removing a gaseous contaminant containing a volatile organic compound in a gaseous stream is provided. In this embodiment, the gaseous stream is brought into contact with a liquid medium in a treatment chamber of a gas scrubber. The liquid medium includes a blend of at least one glycol ether or at least one $C_6$-$C_{18}$ alcohol as well at least one solubility enhancer for the volatile organic compound. The volatile organic compound is absorbed by the liquid medium in the treatment column. A gaseous product stream substantially free of volatile organic compounds is then removed from the treatment chamber.

In an embodiment, the gaseous feedstream containing the volatile organic compounds is an effluent emitted from a storage tank, pipeline or operating unit.

In another embodiment of the disclosure, a method for scavenging hydrogen sulfide and/or mercaptans from a gaseous feedstream is provided. In this embodiment, a gaseous stream containing hydrogen sulfide, mercaptans or a mixture of hydrogen sulfide and mercaptans is brought into contact with a liquid medium in a treatment chamber of a gas scrubber. The liquid medium includes a hydrogen sulfide and/or mercaptan scavenger. The gaseous feedstream is allowed to intermingle with the hydrogen sulfide scavenger in the treatment chamber. The gaseous product removed from the treatment chamber is substantially free of hydrogen sulfide and/or mercaptans.

In another embodiment, the liquid medium containing the hydrogen sulfide and/or mercaptan scavenger further contains a liquid hydrocarbon such as diesel, kerosene, gasoline, jet fuel or fuel oil or a mixture thereof.

Accordingly, the present disclosure includes features and advantages which enable advancements in the control and emissions of VOCs, hydrogen sulfide and mercaptans from a gaseous stream. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
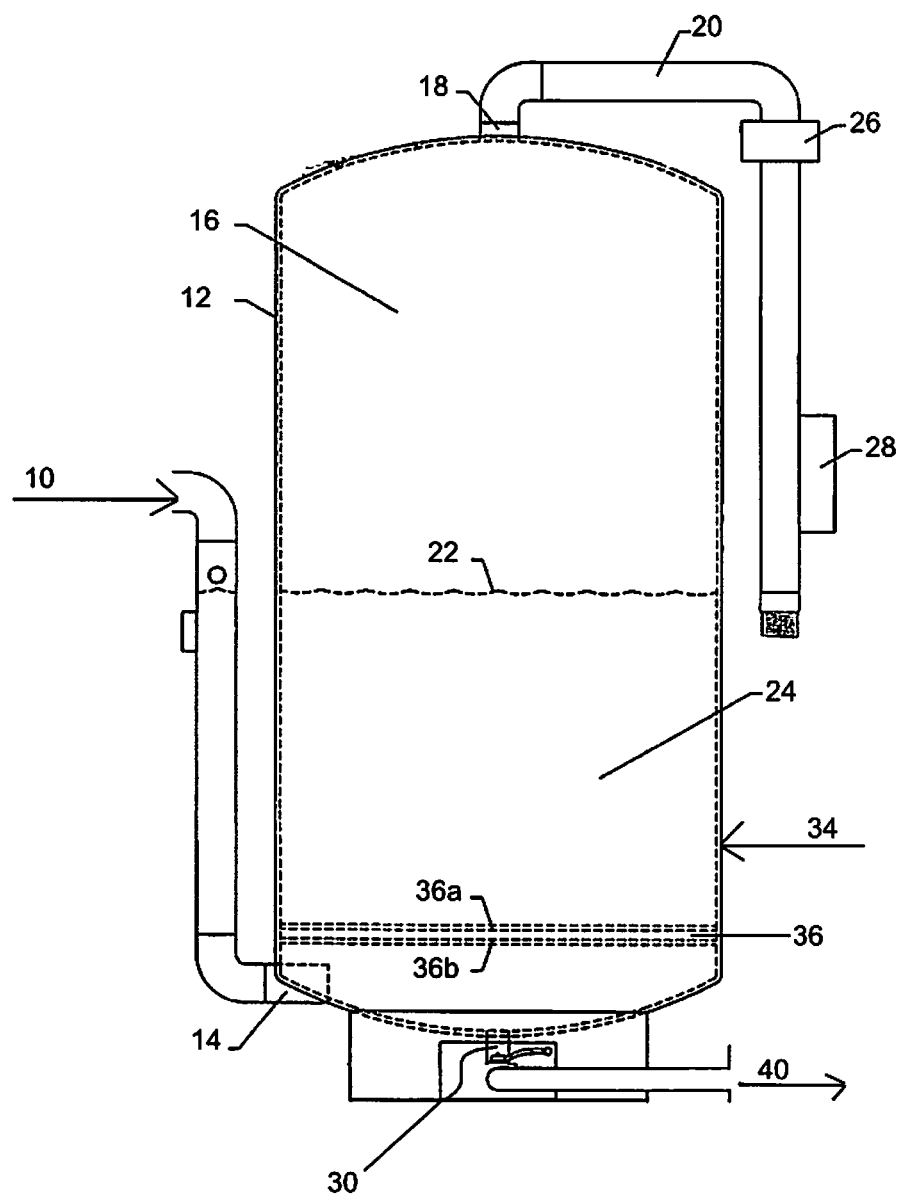
FIG. 1 and FIG. 2 illustrate methods, as disclosed herein, for removing gaseous contaminants from a gaseous stream.

Characteristics and advantages of the present disclosure and additional features and benefits will be readily apparent to those skilled in the art upon consideration of the following detailed description of exemplary embodiments of the present disclosure and referring to the accompanying figure. It should be understood that the description herein and appended drawing, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figure, the figure is not necessarily drawn to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Contaminants in a gaseous feedstream may be removed by passing the feedstream through a treatment chamber within a gas scrubber. The gaseous feedstream may contain hydrogen sulfide, mercaptans, volatile organic compounds (VOCs) or a mixture thereof.

The treatment chamber contains a liquid medium. The liquid medium may contain a hydrogen sulfide or mercaptan scavenger or a mixture thereof. Hydrogen sulfide and/or mercaptans in the gaseous feedstream may react with the hydrogen sulfide and/or mercaptan scavengers. In an embodiment, the efficiency of the reaction may be enhanced by including in the liquid medium a hydrocarbon such as diesel, kerosene, gasoline, jet fuel, fuel oil, naphtha or a mixture thereof.

The liquid medium may also be suitable for VOC contaminants and contain an absorbent and a hydroxy containing compound. VOC contaminants in the gaseous feedstream may then be absorbed within the liquid medium and removed from the treatment chamber with the liquid medium.

The treated scrubbed gas containing VOCs absorbed in the liquid medium and/or hydrogen sulfide and/or mercaptan reaction products which exit the treatment chamber are substantially free of the contaminants, generally containing little if any measurable amount of contaminants.

The orientation of the treatment chamber in the gas scrubber may be vertical, horizontal or angled. The gas scrubber may contain more than one treatment chamber. For instance, the gas scrubber may be defined by a single treatment chamber or a series of treatment chambers. In the latter, each treatment chamber may contain the liquid medium. Where the gas scrubber contains multiple treatment chambers, the liquid medium in the multiple treatment chambers may be the same or different. When a series of treatment chambers are present in a gas scrubber, the treatment chambers may be adjacent to each other or may be more segregated.

In an embodiment, the gaseous feedstream may be introduced to the treatment chamber at a rate between about 0.1 cubic feet per minute (CFM) to about 20,000 CFM. A vacuum venturi pump, liquid ring pump, reciprocating blower or other mechanical air movement equipment may be used to introduce the gaseous feedstream into the treatment chamber.

The rate at which the treated gaseous stream (or scrubbed gas) is removed from the treatment chamber may be identical to the rate of introduction of the gaseous feedstream into the treatment chamber. Typically, however, the rate that the treated gaseous stream is removed from the treatment chamber is less than the rate the gaseous stream enters the treatment chamber is reduced by the amount of contaminants removed during treatment. The residence time of the gaseous feedstream in the treatment chamber is typically dependent on the operating conditions and discharge requirements of the product stream.

Typically VOCs include benzene, toluene, ethylene, xylene, hexane; oxygenated hydrocarbons like ethanol, methyl t-butyl ether; chlorinated hydrocarbons; acetic acid; ammonia; aldehydes such as formaldehyde; ketones; lower molecular weight components found in gasoline, jet fuel and diesel, or a mixture thereof. As the gaseous feedstream pass through the absorption medium, VOCs are captured in the absorbent defining the liquid medium and are removed to render a treated scrubbed gas with much lower to no reasonably measured contaminants in the effluent gas.

The liquid medium for absorption of the VOCs typically has a density greater than the density of the VOCs sought to be removed. In an embodiment, the liquid medium is a blend of multiple components. One component of the blend may be a liquid absorbent. Suitable liquid absorbents may be non-polar hydrocarbons such as diesel, kerosene, gasoline, jet fuel, fuel oil, naphtha or a mixture thereof. Other suitable contaminant solubility enhancers may include methyl esters or a blend of animal fat and vegetable oil (especially a 80:20 v/v blend). A preferred methyl ester is soy methyl ester.

The other component of the blend may be a hydroxy containing compound. The hydroxy containing compound may be glycol ether and/or a $C_6$-$C_{18}$ alcohol. Preferred glycol ethers include dipropylene glycol methyl ether, propylene glycol n-butyl ether, propylene glycol phenyl ether, ethylene glycol monohexyl ether, diethylene glycol monohexyl ether and mixtures thereof. Preferred $C_6$-$C_{18}$ alcohols include cyclohexanol, 2-ethylhexanol, oleyl alcohol, 2-butyl-1-octanol, 1-propoxy-2-propanol and mixtures thereof. Typically, the volume ratio of hydroxy containing compound:liquid absorbent in the blend is between from about 1:99 to about 99:1, preferably between from about to 5:95 to about 30:70 by volume.

The presence of the hydroxy containing compound in the blend enhances the solubility of the VOCs in the absorbent and enhances the recovery of VOCs from the gaseous feedstream. For instance, where a liquid medium contains a methyl ester absorbent (but not the hydroxy containing compound) about 20% by volume of light hydrocarbons from a gaseous feedstream may be absorbed. Absorption of the light hydrocarbons may increase to 30 or 35% by volume when the liquid medium contains the hydroxy containing compound in combination with the methyl ester absorbent.

The concentration of contaminants in the gaseous feedstream may be greater than 0 ppb to saturation, such as in the range of about 20 ppm to in excess of 30%.

The gaseous feedstream may also contain sulfur containing gases such as hydrogen sulfide, mercaptans, organic sulfides, other sulfhydryl compounds, etc. Such sulfur containing gases are captured by reaction of the sulfur containing gases with hydrogen sulfide and/or mercaptan scavengers in the treatment chamber. The treated scrubbed gas is substantially free of gaseous contaminants, i.e., much lower to no reasonably measured contaminants.

The gaseous feedstream may further contain a combination of sulfur containing gases and VOCs. The liquid medium for absorption of the VOCS may be as defined above.

Representative hydrogen sulfide scavengers for removal of hydrogen sulfide and/or mercaptans include triazines such as hexahydrotriazine derivatives as well as mixture of triazine derivatives and an amine, such as monomethylamines, monoethanolamine, ethylenediamines and di-butyl amines. Glyoxal based hydrogen sulfide scavengers may also be used as well as maleimides, formaldehydes, amines, amine oxides, carboxamides, alkylcarboxyl-azo compounds, cumine-peroxide compounds, morpholine derivatives, piperazine derivatives and alkanolamines.

Suitable hydrogen scavengers include water soluble condensation reaction products of formaldehydes and amines, such as monomethylamines, monoethanolamine and diethylentriamines in the presence of a solvent such as an ethylene glycol ether or methanol. Other scavengers include reaction products of amines and ethylene oxide (EO) in the presence of a solvent such as an ethylene glycol ether or methanol. Quinone-based mercaptan scavengers may also be used.

The hydrogen sulfide and/or mercaptan scavengers may further be used with a neutralizer, buffer or a mixture thereof.

The liquid medium may further contain one or more other additives typically employed in selective gas removal processes. Such additives include antifoaming agents, antioxidants, corrosion inhibitors, scale inhibitors, etc. The amount of such additives in the absorbent medium is that which renders them effective for the system in use and the gaseous feedstream being treated.

The gas scrubber may be composed of carbon steel, stainless steel or steel alloys, aluminum, bronze, brass copper, polyethylene, polypropylene, tungsten, polyvinyl chloride, reinforced fiberglass, concrete or a combination thereof. The scrubber is preferably resistant to internal pressures up to about 2500 psi and operates without the application of an external temperature source.

Suitable scrubbers for treatment of the gaseous feedstream disclosed herein may include the vessels set forth in U.S. Pat. Nos. 7,740,816; 7,803,337; 8,795,420; and 8,801,843, herein incorporated by reference.

In an embodiment, the level of VOCs and/or hydrogen sulfide may be detected prior to introducing the feedstream into the scrubber. In another embodiment, the amount of VOCs and/or hydrogen sulfide in the feedstream may be detected at any time after the feedstream is introduced into the scrubber but prior to entry into the treatment chamber. In addition, the amount of VOCs and/or hydrogen sulfide in the treated stream exiting the treatment chamber may also be detected. The efficiency in removal of VOCs and/or hydrogen sulfide from a feedstream in the scrubber may therefore be assessed.

In those instances, where a targeted level of removal of VOCs and/or hydrogen sulfide from the feedstream has not been attained, the operator may opt to recycle the treated stream back to the treatment chamber, subject the treated stream to one or more additional scrubbers (which may be connected in parallel or series to the scrubber), change one or more treatment parameters within the scrubber such as pH, temperature or pressure, adjust the residence time of the feedstream in the treatment chamber, adjust the flow rate of the feedstream into the treatment chamber, refresh the treatment chamber with one or more of the scavenger, absorbent or hydroxy containing compound, etc. Interscan is manufacturing gas sensors, gas analyzers, gas detectors, gas monitors and fixed or installed or continuous gas monitoring systems.

The sensor may be a commercially available gas analyzer and may be integrated as a component of the scrubber. Such sensors may include a metal oxide semiconductor that changes the resistance that is normally produced by desorption and adsorption of hydrogen sulfide in a film such as a gold thin film or tin oxide film. Other sensors include $SnO_2$—Ag nanocomposites, optionally on a ceramic wafer. Gas chromatograph analyzers and gas sensors based on differentiating ion mobility spectrometry can be also used.

A representative scrubber for use in the methods disclosed herein is illustrated in FIG. 1. As shown, scrubber 12 may have a gas inlet 14, typically below the level of liquid medium 24 in treatment chamber 16. Gas inlet 14 can be connected to a feedstream source 10 that contains the gases to be treated. A distribution header 36, such as a sintered permeable membrane of a ceramic, silicon, polyethylene, glass, etc., may be diffused across the bottom of treatment chamber 16 above the entry of the gaseous feedstream through gas inlet port 14.

The treated scrubbed gas is evacuated from scrubber 12 through gas exit port 18 above treatment chamber 16. In an alternative embodiment, instead of directly exiting scrubber 12 through gas exit port 18, the treated scrubbed gas may pass from gas exit port 18 into conduit 20 where it may be vented to the atmosphere or sent into a second treatment gas scrubber for further treatment. Such additional scrubbers may be used to enhance treatment or scrubbing of gaseous feedstreams when excess capability might be needed.

Further, multiple scrubbers connected in parallel or in a series may be used to enhance the removal of VOCs and/or hydrogen sulfide, mercaptans, sulfhydryl compounds, etc. from a gaseous feedstream. For instance, a second gas scrubber may be used to absorb more volatile gases in the feedstream which were not absorbed in a first gas scrubber. The absorption medium may further be varied in one or more of the multiple gas scrubbers from the first gas scrubber. This may be particularly beneficial in the treatment of a gaseous feedstream containing multiple contaminants to differentially treat the contaminants in the feedstream.

FIG. 1 further illustrates the level 22 of the liquid medium 24 in treatment chamber 16. During treatment liquid medium 24 may move up and down in treatment chamber 16 providing variable liquid levels 22.

A knock out canister 26 may be connected to conduit 20 and may be between gas exit port 18 and vent 28. Liquid entrained in the treated scrubbed gas may be removed or captured in the knock out canister. Such liquids may contain effluent gases not removed in the treatment chamber.

Liquid in treatment chamber 12 may pass through drain port 30 into collection tank 40. The liquid collected in collection tank 40 is typically enriched in contaminants. Once the liquid in collection tank 40 is saturated, it may be withdrawn and subjected to fractional distillation. Low molecular weight hydrocarbons may then be recycled into the refining process or another recycling operation. Any enhancers, emulsifiers or other agents used with the absorbent to capture the VOCs or sulfur containing gas may also be recovered and recycled.

The scrubber containing the liquid medium disclosed herein may be used to treat a wide host of gaseous effluents. For instance, the scrubber may be used to treat gaseous effluents produced in chemical and metallurgical operations including utility and chemical plants and refineries as well as gases, such as hydrogen sulfide, produced from an oil or gas well. Thus, the gaseous effluents may originate during the treatment or recovery of liquid hydrocarbons, natural gas, liquefied natural gas, liquefied petroleum gas, fuel gases, sour off-gases, off-gas streams in coal gasification plants, geothermal vent gas, shale oil plant, underground coal gasification plant gases, Claus tail gases, enhanced oil recovery vent gases, a syngas, LPG, FCC off-gas, FCC gasoline, etc.

In an embodiment, liquid from the knock out canister and/or the collection tank may be transferred to a slop tank. The slop tank may contain residual hydrocarbons and/or wastewater from a variety of sources as well as solid, liquid and gaseous contaminants. The contents of the slop tank may be introduced into crude oil and/or into refineries as recovered liquids or may be introduced into any of the gaseous feedstreams or any of the originating sources of gaseous effluents.

In addition, since the scrubber containing liquid medium is not dependent on externally applied temperatures or pressures, the scrubber may be transported to a remote or an isolated location. For instance, the scrubber may be mounted onto a vehicle, such as a truck, and transported to the remote location. At its destination, a vacuum pump may be connected to the scrubber, if needed.

Referring again to FIG. 1, during operation, liquid medium 24 may be introduced into treatment chamber 16 through liquid feed line 34. Typically, the amount of liquid medium in the treatment chamber may be between from about 25 to about 50 volume percent. While feed line 34 is depicted as being above gas inlet port 14 and above upper surface 36a of optional permeable membrane 36, it may be located below bottom surface 36b. At least a portion of the liquid medium is typically introduced into treatment chamber 16 prior to entry of the gaseous feedstream. Typically, liquid medium is introduced into treatment chamber 16 prior to the addition of the gaseous feedstream. In an embodiment, a portion of the liquid medium may be introduced into treatment chamber 16 after entry of the gaseous feedstream.

The gaseous feedstream is typically introduced into the bottom portion of gas scrubber 12. The rate at which the gaseous feedstream is introduced into the scrubber may be equivalent to the rate that the treated scrubbed fluid is vented from the treatment chamber.

As illustrated, the gaseous feedstream is depicted as entering into treatment chamber 16 beneath the bottom surface 36b of permeable membrane 36. Pressure may then be increased in the treatment chamber. For example, pressure may be increased as gases enter the scrubber at the bottom portion of treatment chamber 16. As depicted with permeable membrane 36 in FIG. 1, the liquid medium begins to move through the pores with the gases as the pressure increases beneath the membrane. The increased surface area of the pores assists in the scrubbing of the gases of the feedstream as a reaction zone is created in the permeable membrane. As scrubbing occurs, the liquid medium moves into treatment chamber 16 above permeable membrane 36.

Within treatment chamber 16, the gaseous feedstream contacts the liquid medium and intermingles with the liquid medium in the sintered permeable membrane. The treated scrubbed gas may be formed in the zone above the top surface 36a of permeable membrane 36 and is then passed to exit port 18.

Typically, the treated scrubbed gas product is substantially free of the gaseous contaminants and exits the scrubber through gas exit port 18 at a rate equal to the rate which the gaseous feedstream is introduced into treatment chamber 16. A pressure drop, generally at least 0.2 psi, is created in the treatment chamber. During the treatment operation, it may be unnecessary to replace the liquid medium. Typically, about 90 to 99.9 volume percent of VOCs and/or hydrogen sulfide may be removed from the gaseous feedstream. Typically, less than 1 volume percent of contaminants are in the treated scrubbed gas leaving the scrubber through exit port 18.

In an embodiment, the amount of VOCs and/or hydrogen sulfide in the gaseous feedstream 10 may be detected prior to the feedstream entering scrubber 12. In addition, the amount of VOCs and/or hydrogen sulfide in the treated stream exiting the treatment chamber through gas exit port 18 may also be detected. The efficiency in removal of VOCs and/or hydrogen sulfide from a feedstream in the scrubber may be assessed.

Figure 2:
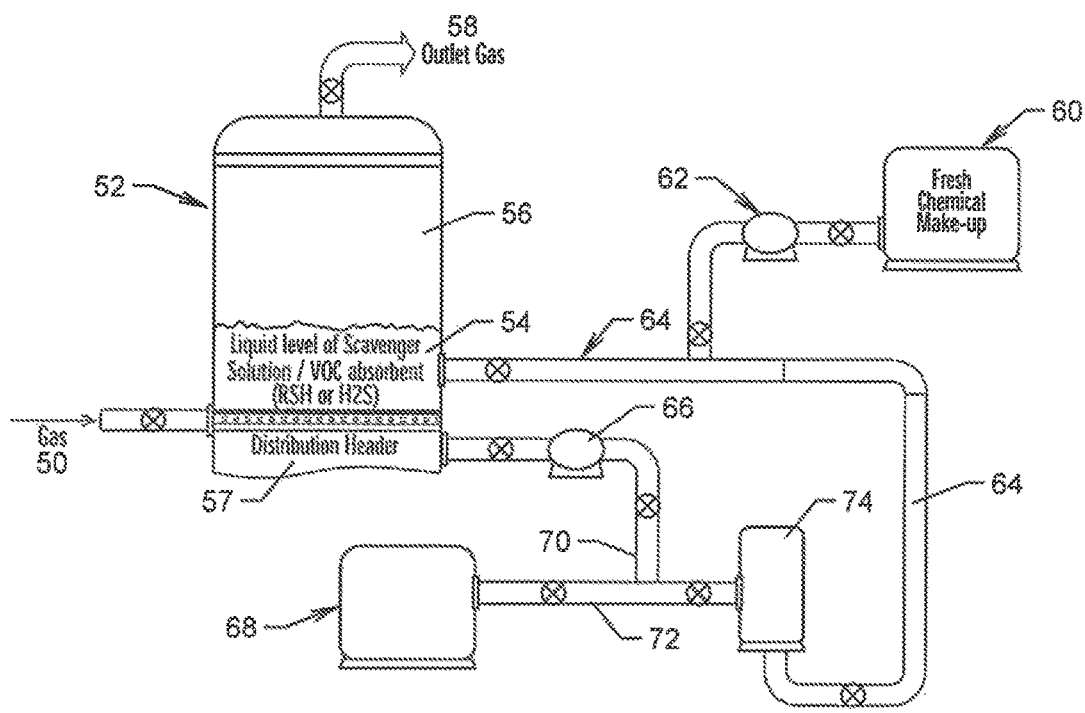

FIG. 2 represents another embodiment of the disclosure wherein gaseous feedstream 50 is metered into gas scrubber 52 and is filtered into treatment chamber 56 via distribution header 57. Prior to entry of the gaseous feedstream, a first liquid medium 54 is placed within treatment chamber 56. First liquid medium 54 may contain hydrogen sulfide or mercaptan scavenger or a blend comprising a VOC absorbent and hydroxy containing compound. Pressure may then be increased in the treatment chamber. Within treatment chamber 56, the gaseous feedstream contacts the first liquid medium and intermingles with the first liquid medium in the distribution header. The treated scrubbed gas may be passed to outlet port 58. During the treatment operation, the first liquid medium is replaced by being metered from tank 60 via pump 62 into line 64. Where the first liquid medium contains the blend of absorbent and hydroxy containing compound, the replacement medium may be one or more of the components of the first liquid medium. The scavenger, absorbent and/or hydroxy containing compound constituting the replacement medium may be the same compound or different compounds from those in the first liquid medium. The replacement medium may be fed directly into treatment chamber 56 and is preferably added during the scrubbing operation.

A waste stream containing VOC contaminates and/or reaction products of scavenger and hydrogen sulfide and/or mercaptans may further be removed from treatment chamber 56 through distribution header 57 and then metered via circulation pump 66 into spent storage tank 68 via lines 70 and 72. The waste stream may further be treated in filter 74 and the contaminants removed from the treatment liquid to render a regenerated liquid. In an embodiment, the waste stream containing absorbed VOCs or sulfide reaction products may be removed from the liquid medium by heating the waste stream. The regenerated liquid may then be fed through line 64 into treatment chamber 56. Changes in the operating parameters including the need to adjust any of the scavenger, absorbent or hydroxy containing compound may be determined by monitoring the removal of the VOCs and/or hydrogen sulfide from the feedstream.

While FIG. 1 and FIG. 2 illustrate placement of the treatment chamber and the distribution header in the horizontal position, these figures are merely exemplary. Any scrubber which contains the embodiments referenced herein may also be employed. For instance, the distribution header could be in a vertical position within the apparatus. Alternatively, efficiency of scrubbing may be increased also by having a series of membranes—horizontally or vertically—which in turn will increase removal efficiency.

The gaseous feedstream subjected to treatment with the absorbent may originate or be a by-product from a liquid containing hydrocarbon. For instance, the gaseous feedstream may be a by-product of shale oil, crude oil, naphtha, petroleum distillates or vacuum bottoms.

In an embodiment, the gaseous feedstream may be emitted from a storage tank, pipeline or operating unit. For instance, the gaseous feedstream may originate from gasoline, jet fuel or diesel fuel within a storage tank, pipeline or operating unit contains.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of removing a gaseous contaminant from a gaseous feedstream in a gas scrubber, the method comprising:
   (a) introducing the gaseous feedstream containing the gaseous contaminant into the gas scrubber through a gas inlet port, the gas scrubber having a treatment chamber which, at the time of entry of the gaseous feedstream into the gas scrubber, contains a liquid medium of either:
      (i) a hydrogen sulfide or mercaptan scavenger; or
      (ii) a blend comprising an absorbent having a density greater than the density of the gaseous contaminant and at least one hydroxy containing compound, wherein the at least one hydroxy containing compound comprises at least one glycol ether or C6-C18 alcohol and wherein the at least one hydroxy containing compound enhances the solubility of the gaseous contaminant in the absorbent;
   (b) intermingling the gaseous feedstream with the liquid medium in the treatment chamber by filtering the gaseous feedstream through a distribution header and scrubbing the gaseous feedstream with the liquid medium while the gaseous feedstream is filtered through the distribution header; and
   (c) removing a treated gaseous product stream from the treatment chamber wherein the treated gaseous product stream is substantially free of the gaseous contaminant.

2. The method of claim 1, wherein the distribution header is a sintered permeable membrane of ceramic, silicon, polyethylene or glass.

3. The method of claim 1, wherein the rate of removal of the treated gaseous stream from the treatment chamber is less than the rate the gaseous stream enters the treatment chamber.

4. The method of claim 1, further comprising passing liquid enriched in contaminant from the treatment chamber through a drain port into a collection tank.

5. The method of claim 1, wherein the gaseous feedstream is a by-product of shale oil, crude oil, naphtha or vacuum bottoms.

6. The method of claim 1, further comprising, after step (b), feeding into the treatment chamber a stream comprising fresh absorbent comprising a hydrogen sulfide or mercaptan scavenger or a blend comprising absorbent and at least one hydroxy containing compound comprising a glycol ether or a C6-C18 alcohol or a mixture thereof.

7. The method of claim 1, wherein the gaseous feedstream is an effluent emitted from a storage tank, a pipeline or an operating unit.

8. The method of claim 7, wherein the storage tank, pipeline or operating unit contains gasoline, jet fuel or diesel fuel.

9. A method for scavenging hydrogen sulfide and/or mercaptans from a gaseous feedstream in a gas scrubber having a gas inlet port and a treatment chamber containing a liquid medium comprising at least one hydrogen sulfide scavenger or mercaptan scavenger, the method comprising:
   (a) introducing the gaseous feedstream containing hydrogen sulfide, mercaptans or a mixture thereof into the gas scrubber through the gas inlet port into the treatment chamber containing the liquid medium;
   (b) moving the gaseous feedstream through a permeable membrane in the treatment chamber at elevated pressure while scrubbing the gaseous feedstream with the liquid medium as the gaseous feedstream passes through the liquid medium to provide a scrubbed gaseous feedstream;
   (c) feeding the scrubbed gaseous feedstream of step (b) from the permeable membrane and further into the treatment chamber and continuing to scrub the gaseous feedstream with the liquid medium; and
   (d) removing gaseous product from the treatment chamber wherein the removed gaseous product is substantially free of hydrogen sulfide and/or mercaptans.

10. The method of claim 9, wherein the hydrogen sulfide scavenger or mercaptan scavenger is a triazine based scavenger.

11. A method of removing a gaseous contaminant containing volatile organic compounds (VOCs) from a gaseous stream comprising:
   (a) contacting the gaseous stream containing the VOCs with a liquid medium in a treatment chamber of a gas scrubber, wherein the liquid medium comprises at least one absorbent for the VOCs and at least one hydroxy compound comprising a glycol ether or a C6-C18 alcohol;

(b) absorbing VOCs into the liquid medium; and (c) removing a gaseous product stream substantially free of VOCs from the treatment chamber wherein the VOCs are at least one of benzene, toluene, ethylene, xylene, hexane, ethanol, methyl t-butyl ether or a chlorinated hydrocarbon.

12. The method of claim 11, further comprises subsequent to step (c), repeating steps (a), (b) and (c) at least once.

13. The method of claim 11, further comprising removing a waste stream from the treatment chamber, wherein the waste stream comprises VOCs within the liquid medium, separating regenerated liquid medium and gaseous contaminant from the waste stream and then introducing into the treatment chamber a gaseous feedstream containing contaminants.

14. The method of claim 11, wherein the absorbent is a liquid hydrocarbon.

15. The method of claim 14, wherein the liquid hydrocarbon is selected from the group consisting of diesel, kerosene, gasoline, jet fuel and fuel oil and mixtures thereof.

16. The method of claim 11, wherein the absorbent of the liquid medium is a methyl ester.

17. The method of claim 16, wherein the absorbent of the liquid medium is soy methyl ester.

18. The method of claim 11, wherein the at least one hydroxy containing compound is at least one glycol ether selected from the group consisting of dipropylene glycol methyl ether, propylene glycol n-butyl ether, propylene glycol phenyl ether, ethylene glycol monohexyl ether, diethylene glycol monohexyl ether and mixtures thereof.

19. The method of claim 11, wherein the at least one hydroxy containing compound is a C6-C18 alcohol selected from the group consisting of cyclohexanol, 2-ethylhexanol, oleyl alcohol, 2-butyl-1-octanol, 1-propoxy-2-propanol and mixtures thereof.

* * * * *